(12) United States Patent
Wang

(10) Patent No.: US 6,583,569 B1
(45) Date of Patent: Jun. 24, 2003

(54) DEVICE FOR AUTOMATICALLY SWITCHING COLOR OF LUMINESCENT DASHBOARD

(76) Inventor: Ching-Hung Wang, 5FL., No. 40, Sec. 2, Tung-Ho West Street, Taipei (TW)

( * ) Notice: Subject to any disclaimer, the term of this patent is extended or adjusted under 35 U.S.C. 154(b) by 0 days.

(21) Appl. No.: 10/113,674

(22) Filed: Apr. 2, 2002

(51) Int. Cl.[7] .............................................. H05B 37/00
(52) U.S. Cl. ........................ 315/79; 315/80; 340/461
(58) Field of Search ................................ 340/461, 462; 315/77, 79, 80

(56) References Cited

U.S. PATENT DOCUMENTS 5,583,484 A * 12/1996 Asano ........................ 340/461

* cited by examiner

*Primary Examiner*—David Vu
(74) *Attorney, Agent, or Firm*—Rosenberg, Klein & Lee

(57) ABSTRACT

A device enables automatic switching of color of a luminescent dashboard in response to changes in driving speed of a car. The device also includes a luminance sensor and a commutating circuit that enable both automatic and manual actuating of a dashboard lamp when a reduced luminance in surrounding environment is sensed by the device.

3 Claims, 3 Drawing Sheets

DEVICE FOR AUTOMATICALLY SWITCHING COLOR OF LUMINESCENT DASHBOARD

BACKGROUND OF THE INVENTION

1. Field of the Invention

The present invention relates to a device for automatically switching the color of a luminescent dashboard, and more particularly to a device that is able to sense a reduced luminance in surrounding environment and to automatically actuate a dashboard lamp accordingly, and enables a luminescent dashboard to automatically switch its color when driving speed changes.

2. Description of the Prior Art

Cold light has been widely employed in displays and indicators as a back light and/or illuminating light in recent years. For example, cold light can be used in a dashboard to provide backlight for a backboard 230 and/or meters 210 of the dashboard, as shown in FIG. 1. In the case of a digital meter, the cold light may also be used to illuminate readings shown on the meter. And, in the case of a needle indicator, the cold light may be used as backlight of the indicator to work with a needle 220 applied with fluorescent material.

In conventional techniques, the cold light employed on dashboard is monochromatic light. To change the color of the cold light, a manual control is required. Since the cold light could be used only as illuminating light without other functions and a dashboard lamp illuminated with cold light must be manually actuated, it is apparent a conventional luminescent dashboard, that is, a dashboard with cold light as its backlight, does not meet the demand of nowadays society.

It is therefore desirable to develop an improved luminescent dashboard.

SUMMARY OF THE INVENTION

A primary object of the present invention is to provide a device for automatically switching the color of a luminescent dashboard when the driving speed changes. When a car moves at high speed, the device of the present invention enables a luminescent dashboard of the car to automatically change its color as a warning to the driver to avoid accident. Therefore, the luminescent dashboard functions like an additional driving speed indicator. For example, a driver on a freeway can easily know whether his or her driving speed is within the speed limit simply by seeing the color of the luminescent dashboard. That is, the device of the present invention has functions of automatically detecting and displaying driving speed.

To achieve the above object, the device of the present invention mainly includes:

a driving power source;

a commutating circuit connected to an output of the driving power source and generally composed of a current limiter, an oscillating circuit, and a transformer for providing stable driving power output;

a voltage control circuit having an input connected to the driving power source and generally composed of a voltage controller, a digital controller, a voltage attenuator, and a frequency controller; the voltage control circuit having an output connected to the commutating circuit with the frequency controller connected to the transformer of the commutating circuit, so as to provide different voltages and frequencies for actuating cold light of different colors;

a luminescent device connected to an output of the commutating circuit to show cold light of different colors in response to variable voltages and variable frequencies provided by the commutating circuit; and a display device connected to an output of the frequency controller for displaying numerals on meters mounted on the luminescent dashboard.

Another object of the present invention is to provide a device for automatically switching the color of a luminescent dashboard that also enables automatic and/or manual actuation of a dashboard lamp when the device senses a reduced luminance in surrounding environment.

To achieve the second object, the device of the present invention provided to achieve the first object further includes a cold light actuating circuit generally composed of a luminance sensor, a trigger circuit, and an electronic switch for connecting to the commutating circuit, so as to automatically actuate the luminescent device for illuminating purpose when the surrounding environment is dark.

To achieve the above objects, the device for automatically switching the color of a luminescent dashboard according to the present invention may also alternatively include:

a driving power source that may be a battery;

a control circuit generally composed of a headlight switch assembly, a current limiter, and an oscillating circuit for adjusting current and outputting control instructions;

a trigger switch circuit generally composed of a luminance sensor, a trigger circuit (Schmidt trigger), and an electronic switch for actuating the electronic switch when a specific luminance is sensed;

a voltage/frequency control circuit mainly composed of a driving control computer, a voltage-stabilizing IC, a digital controller, an increment key, a decrement key, a voltage attenuator, and a frequency controller;

wherein the driving control computer provides information about driving speed, the increment key, the decrement key, and the voltage attenuator together control a magnitude of output voltage, and the digital controller outputs variable-frequency signals to the frequency controller; and an auto-connected boosting transformer for receiving the output signal from the control circuit and the output voltage and output frequency from the voltage/frequency control circuit in order to operate a luminescent member, and feeding any obtained information back to the control circuit.

By providing the commutating circuit, the voltage control circuit, and the frequency controller, it is possible for the device of the present invention to output variable voltages and frequencies for actuating cold light of different colors. Since the output voltage and the frequency change with driving speed, cold light of different colors are shown when the driving speed changes. And, with the cold light actuating circuit, the luminescent device is automatically actuated to provide illuminating cold light when the surrounding environment becomes dark.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
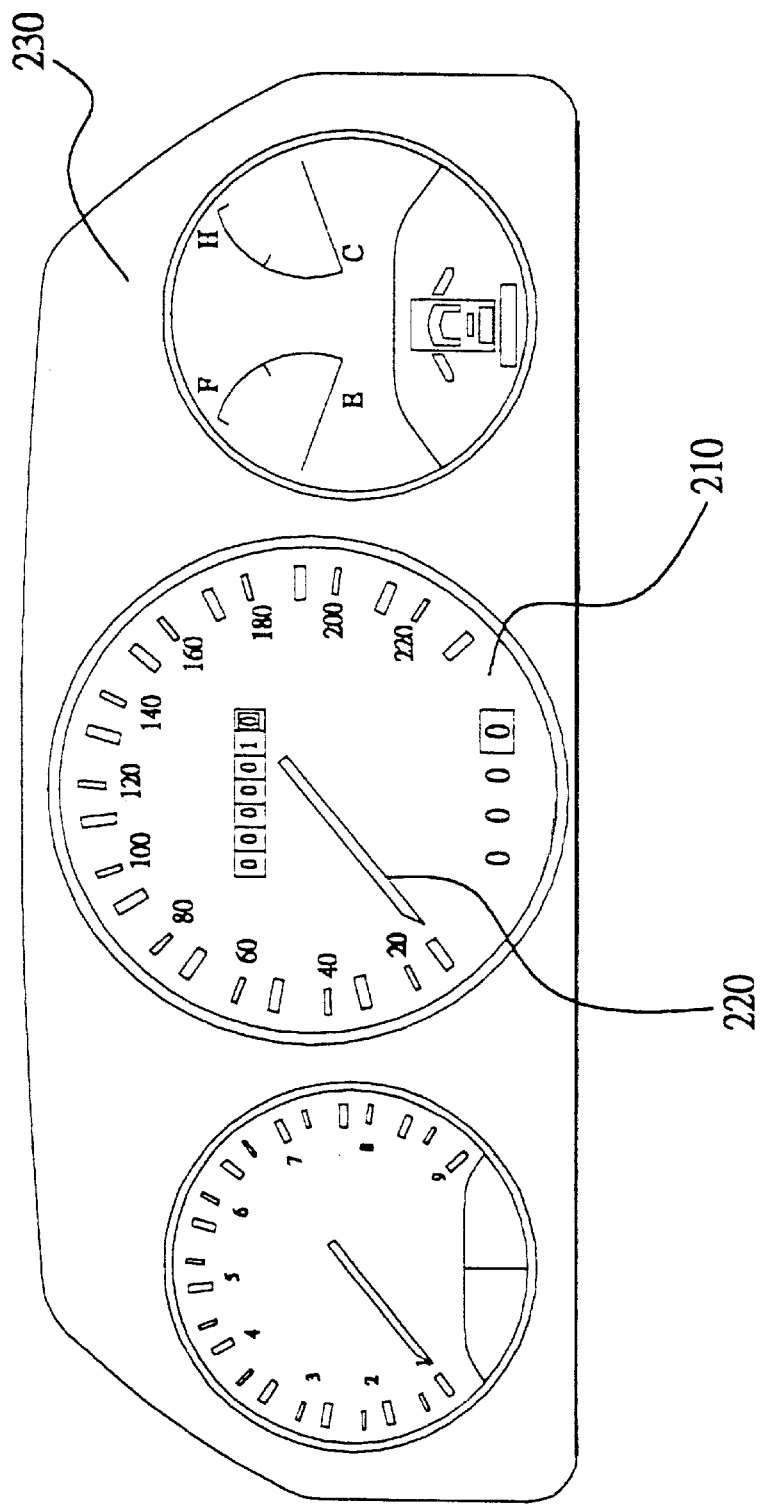
FIG. 1 is a schematic view of a dashboard.
Figure 2:
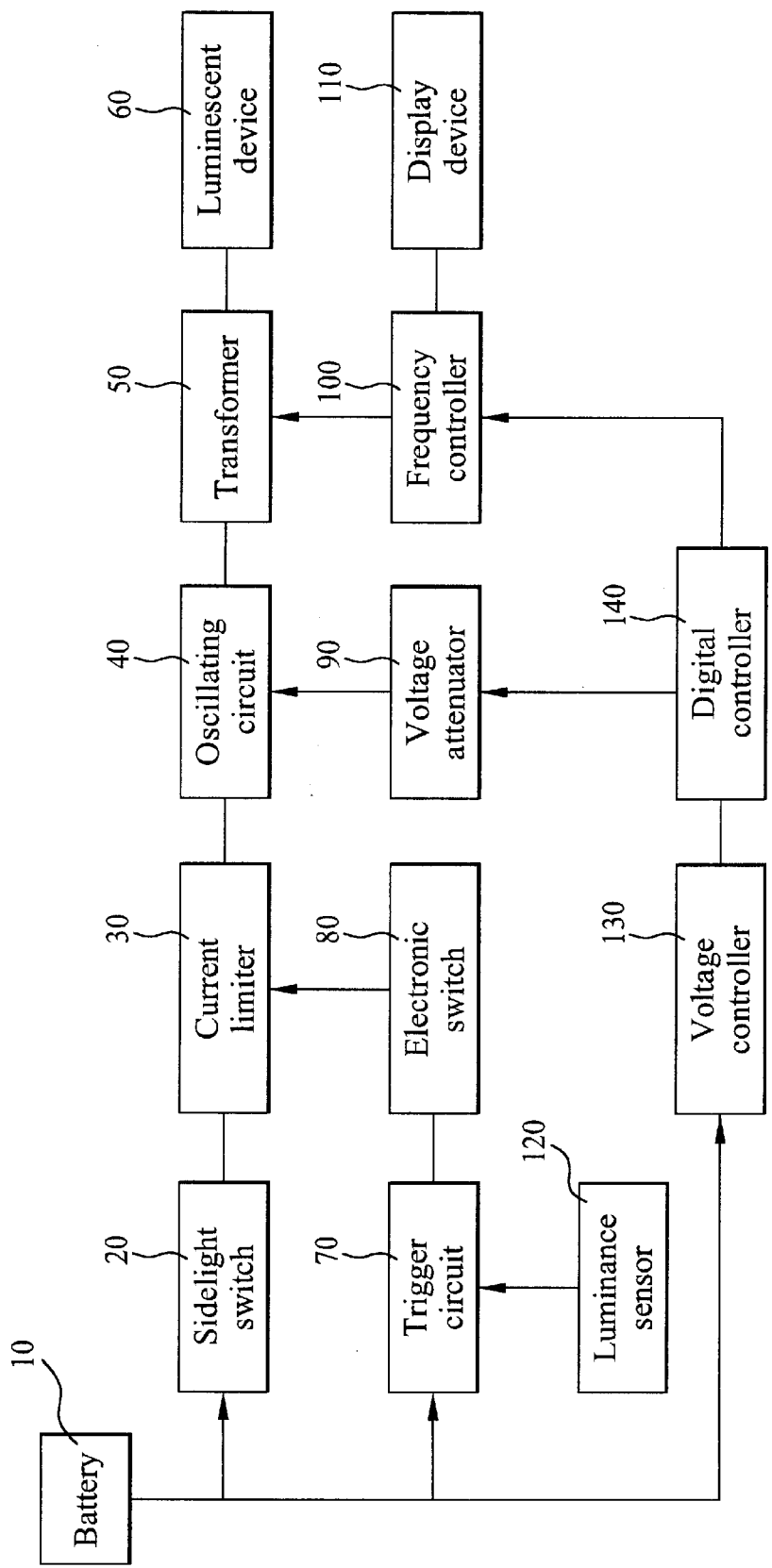
FIG. 2 is a block diagram showing the structure of a device for automatically switching the color of a dashboard according to a first embodiment of the present invention.

Please refer to FIG. 2 that is a block diagram showing the structure of a device for automatically switching the color of a dashboard according to a first embodiment of the present invention. As shown, the device mainly includes:

a battery 10 serving as a source of driving power;

a sidelight switch 20;

a voltage control circuit composed of a voltage attenuator 90, a frequency controller 100, a voltage controller 130, and a digital controller 140;

a cold light actuating circuit composed of a trigger circuit 70, an electronic switch 80, and a luminance sensor 120;

a multicolor luminescent device 60; and a display device 110.

When the luminance sensor 120 senses reduction of luminance in surrounding environment, the cold light actuating circuit automatically actuates the luminescent device 60 for the latter to luminescence and therefore illuminates the surrounding environment.

Moreover, the device according to the present invention is capable of detecting a driving speed. In response to the detected driving speed, the voltage control circuit and the commutating circuit apply a driving voltage to the multicolor luminescent device 60, so that the latter is driven to generate cold light of a specific color corresponding to the applied driving voltage, and accordingly, to the detected driving speed. Showing cold light of specific color in response to changes in driving speed advantageously reminds a driver of the current driving speed to avoid accidents possibly caused by extremely high or low driving speed. The frequency controller 100 outputs numeric indications, such as driving speed, to the display device 110 of meters mounted on the dashboard.

Figure 3:
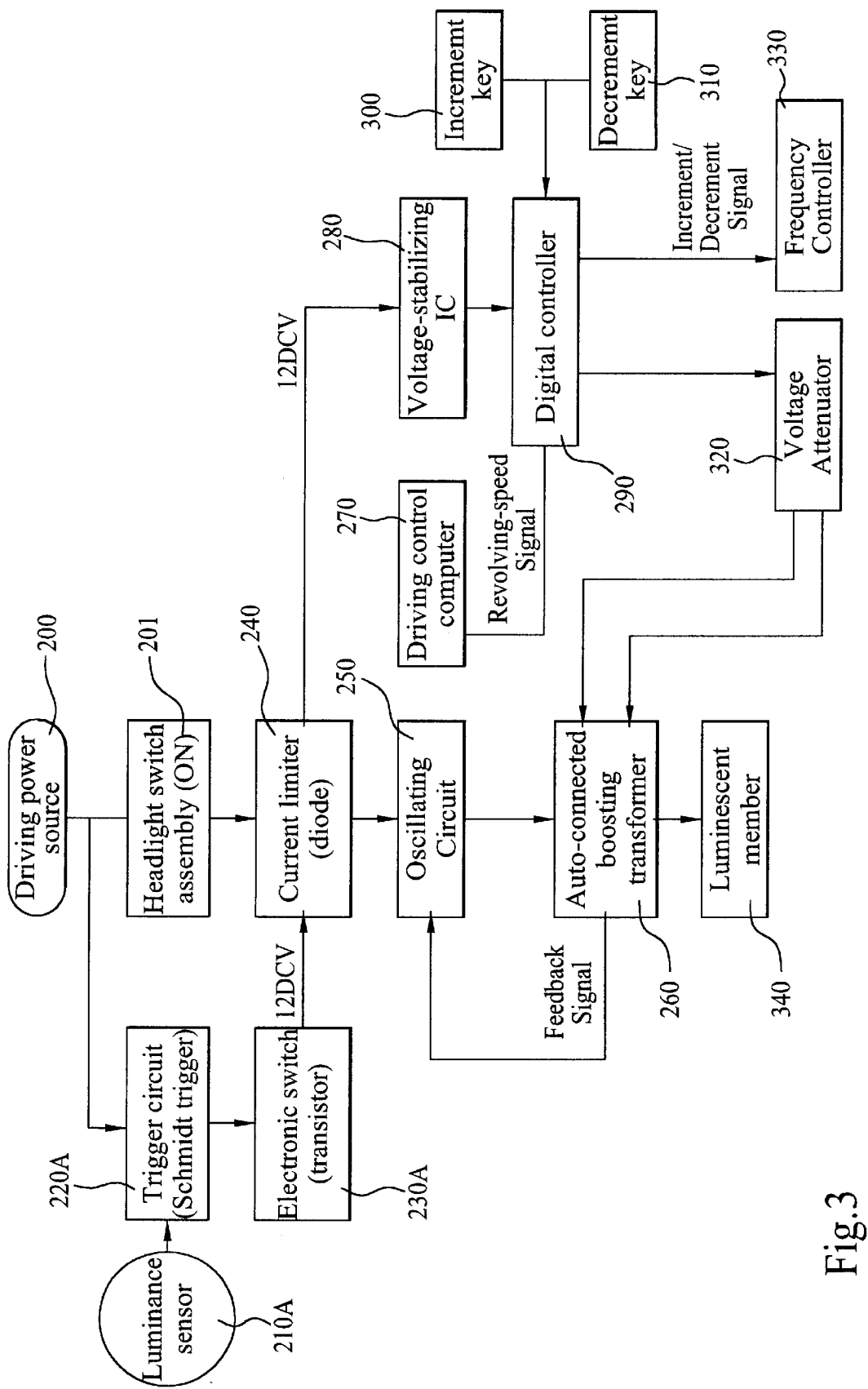
FIG. 3 is a block diagram showing the structure of a device for automatically switching the color of a dashboard according to a second embodiment of the present invention.

FIG. 3 is a block diagram showing the structure of a device for automatically switching the color of a dashboard according to a second embodiment of the present invention. As shown, the device of the second embodiment mainly includes:

a driving power source 200 that may be a battery;

a control circuit generally composed of a headlight switch assembly 201, a current limiter 240, and an oscillating circuit 250 for adjusting current and outputting control instructions;

a trigger switch circuit generally composed of a luminance sensor 210A, a trigger circuit (Schmidt trigger) 220A, and an electronic switch 230A for actuating the electronic switch 230A when a specific luminance is sensed;

a voltage/frequency control circuit mainly composed of a driving control computer 270, a voltage-stabilizing IC 280, a digital controller 290, an increment key 300, a decrement key 310, a voltage attenuator 320, and a frequency controller 330; wherein the driving control computer 270 provides information about driving speed, the increment key 300, the decrement key 310, and the voltage attenuator 320 together control a magnitude of output voltage, and the digital controller 290 outputs variable-frequency signals to the frequency controller 330; and an auto-connected boosting transformer 260 for receiving the output signal from the control circuit and the output voltage and frequency from the voltage/frequency control circuit in order to operate a luminescent member 340, and feeding back any obtained information to the control circuit.

The device of the second embodiment is structurally different from the device of the first embodiment but provides substantially the same effect as that provided by the first embodiment, and provides even better efficiency in terms of automatic control.

As mentioned above, with the commutating circuit and the voltage control circuit, different driving voltages can be output to the multicolor luminescent device 60 for the latter to generate cold light of different colors. Thus, the device of the present invention enables the luminescent dashboard to automatically switch its color in response to changes in driving speed sensed by the device and therefore timely warns the driver of the current driving speed. Moreover, with the cold light actuating circuit, the luminescent device 60 can be automatically actuated when a darkened surrounding environment is sensed. Therefore, the device of the present invention provides automatic control to save a user's time and efforts.

The present invention has been described with some preferred embodiments thereof and it is understood that many changes and modifications in the described embodiments can be carried out without departing from the scope and the spirit of the invention as defined by the appended claims.

What is claimed is:

1. A device for automatically switching color of luminescent dashboard, comprising:

a driving power source;

a commutating circuit connected to an output of said driving power source and generally composed of a current, limiter, an oscillating circuit, and a transformer for providing stable driving power output;

a voltage control circuit having an input connected to said driving power source and generally composed of a voltage controller, a digital controller, a voltage attenuator, and a frequency controller; said voltage control circuit having an output connected to said commutating circuit with said frequency controller connected to said transformer of said commutating circuit, so as to provide different voltages and frequencies for actuating cold light of different colors;

a luminescent device connected to an output of said commutating circuit to generate cold light of different colors in response to variable voltages and variable frequencies provided by said commutating circuit; and a display device connected to an output of said frequency controller for displaying numerals on meters mounted on said luminescent dashboard.

2. The device for automatically switching color of luminescent dashboard as claimed in claim 1, further comprising a cold light actuating circuit connected to said commutating circuit and generally composed of a luminance sensor, a trigger circuit, and an electronic switch; said cold light actuating circuit automatically actuating said luminescent device to illuminate said dashboard when a surrounding environment has a reduced luminance.

3. A device for automatically switching color of luminescent dashboard, comprising:

a driving power source that may be a battery;

a control circuit generally composed of a headlight switch assembly, a current limiter, and an oscillating circuit for adjusting current and outputting control instructions;

a trigger switch circuit generally composed of a luminance sensor, a trigger circuit (Schmidt trigger), and an electronic switch for actuating said electronic switch when a specific luminance is sensed;

a voltage/frequency control circuit mainly composed of a driving control computer, a voltage-stabilizing IC, a digital controller, an increment key, a decrement key, a voltage attenuator, and a frequency controller; wherein said driving control computer providing information about driving speed, said increment key, said decrement key, and said voltage attenuator together controlling a magnitude of output voltage, and said digital controller outputting variable-frequency signals to said frequency controller; and an auto-connected boosting transformer for receiving an output signal from said control circuit and output voltage and output frequency from said voltage/frequency control circuit in order to operate a luminescent member, and feeding any obtained information back to said control circuit.

* * * * *